United States Patent [19]

Knödler et al.

[11] 4,006,055
[45] Feb. 1, 1977

[54] RESILIENT TENSION DEVICE IN NUCLEAR REACTORS

[75] Inventors: Diethelm Knödler; Hans Kropfl; Alexander Steinke, all of Erlangen, Germany

[73] Assignee: Siemens Aktiengesellschaft, Munich, Germany

[22] Filed: Aug. 10, 1972

[21] Appl. No.: 279,290

[30] Foreign Application Priority Data

Aug. 11, 1971   Germany .......................... 2140170

[52] U.S. Cl. ................................. 176/61; 176/65; 176/87
[51] Int. Cl.² ........................................ G21C 19/28
[58] Field of Search .................. 176/50, 87, 61, 79, 176/65

[56] References Cited

UNITED STATES PATENTS

| | | | |
|---|---|---|---|
| 3,158,543 | 11/1964 | Sherman et al. .................... | 176/50 |
| 3,212,979 | 10/1965 | Silverblatt .......................... | 176/50 |
| 3,382,153 | 5/1968 | Bigge et al. .......................... | 176/50 |
| 3,398,050 | 8/1968 | Yevick et al. ....................... | 176/50 |
| 3,669,834 | 6/1972 | Klumb .................................. | 176/87 |
| 3,770,583 | 11/1973 | Klumb et al. ........................ | 176/79 |
| R27,173 | 9/1971 | Lass et al. ............................ | 176/87 |

*Primary Examiner*—Verlin R. Pendegrass
*Assistant Examiner*—Peter A. Nelson
*Attorney, Agent, or Firm*—Kenyon & Kenyon Reilly Carr & Chapin

[57] ABSTRACT

A nuclear power reactor has an active zone in which a plurality of fuel elements containing a large number of fuel rods are held between two grid plates. A tension device is disclosed which is provided for each fuel element and holds the same between the grid plates. The tension device includes a resilient pressure arrangement disposed between one of the grid plates and the end portion of the fuel element facing the one grid plate for holding the fuel element against the other one of the grid plates.

3 Claims, 10 Drawing Figures

Fig.2-9

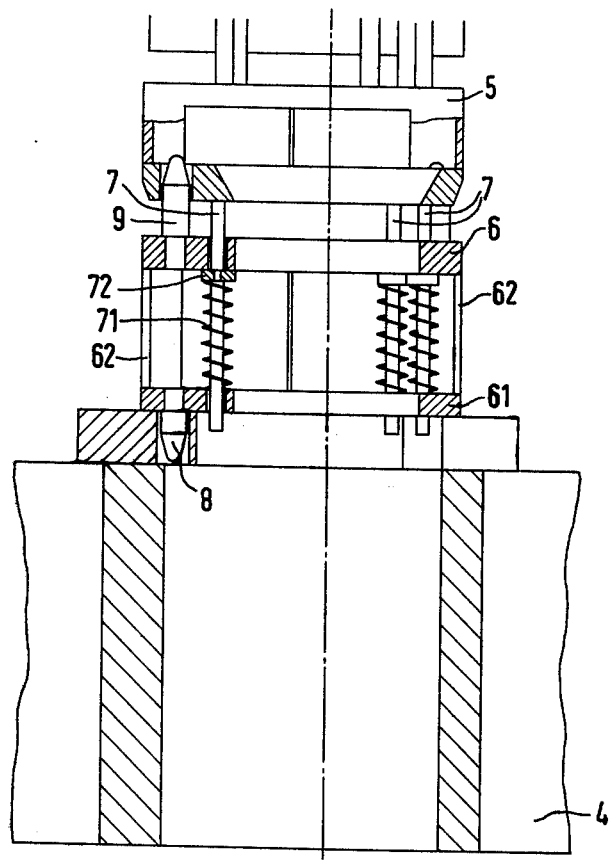
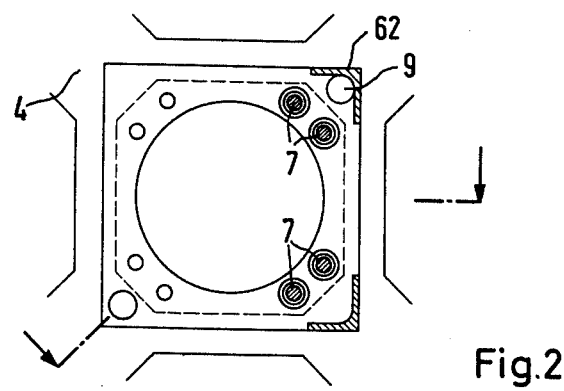
Fig.2

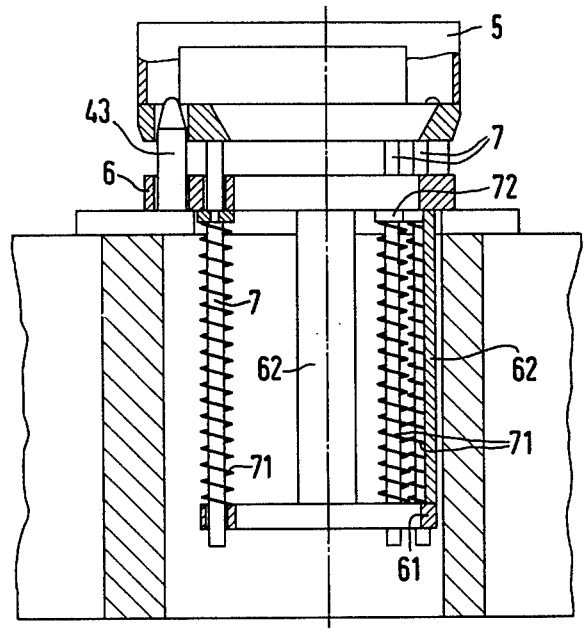
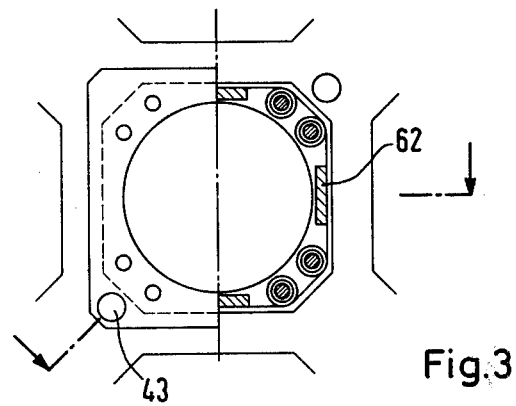
Fig. 3

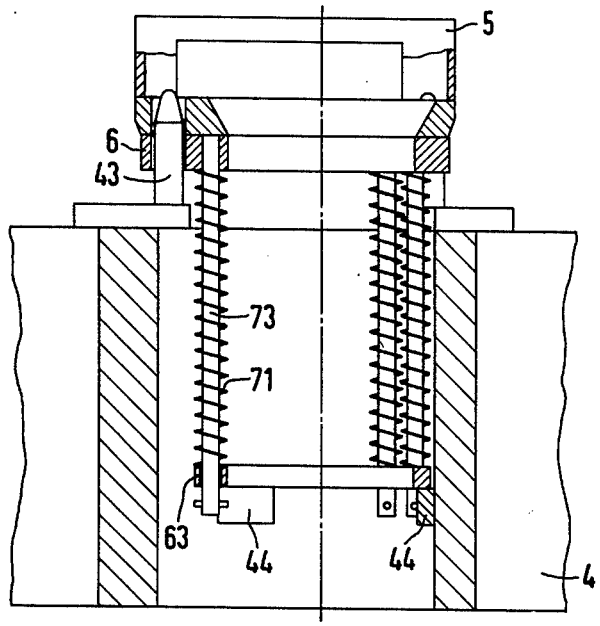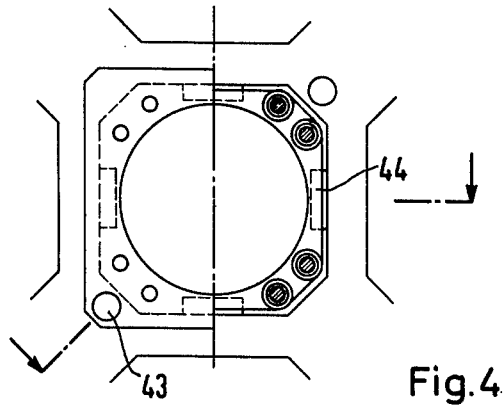
Fig. 4

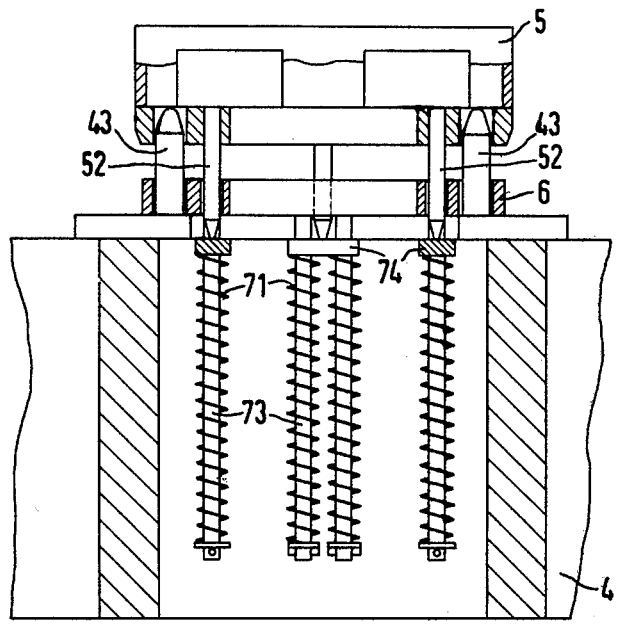
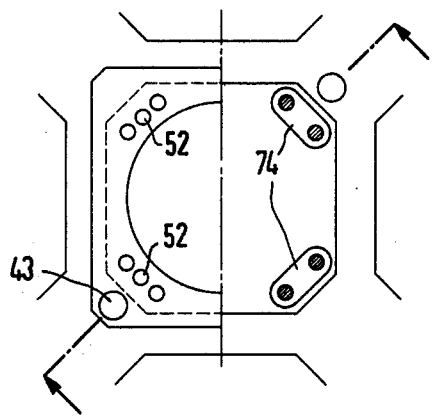
Fig.5

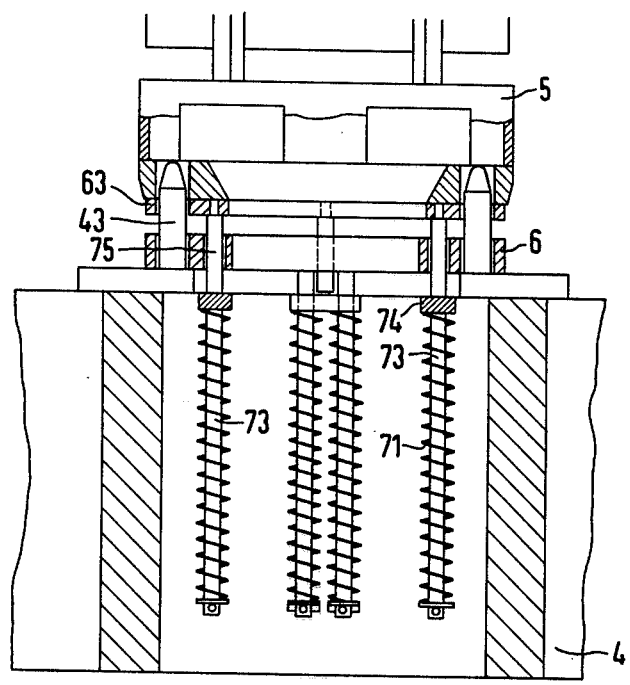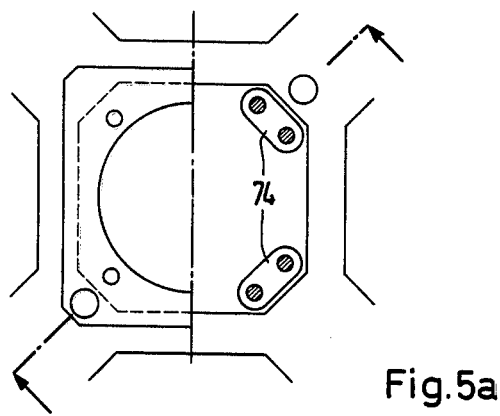
Fig.5a

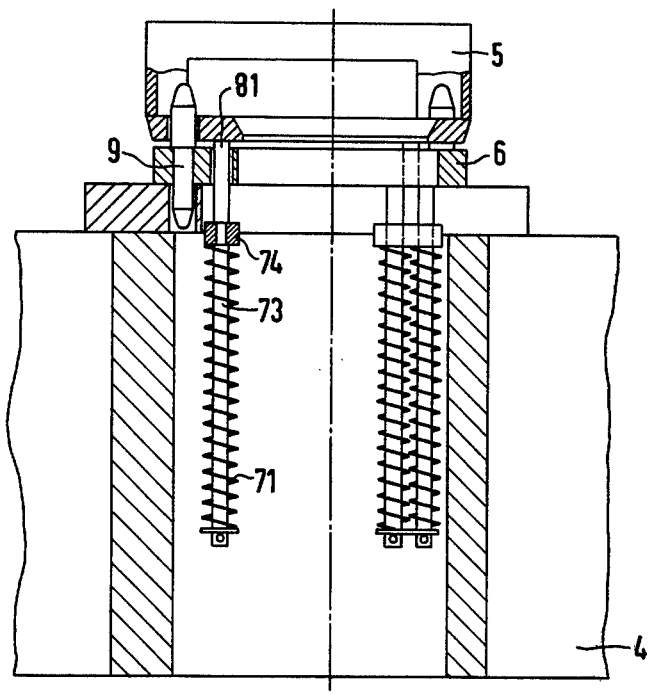
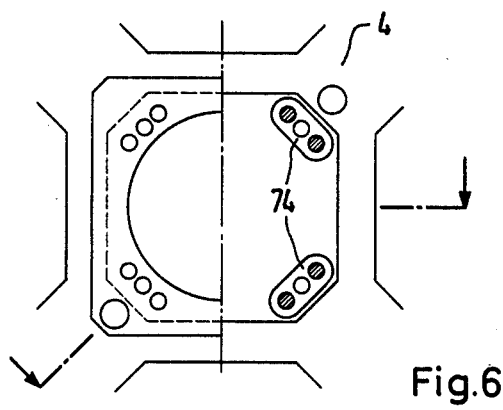
Fig.6

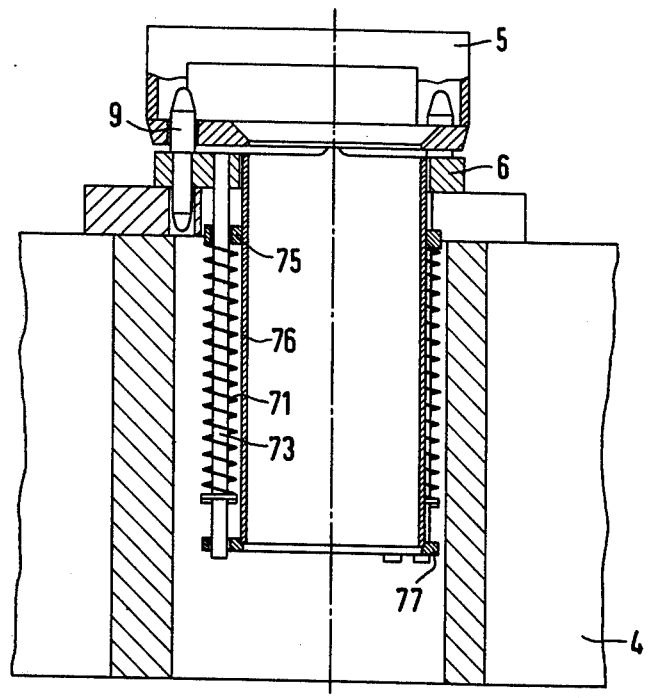
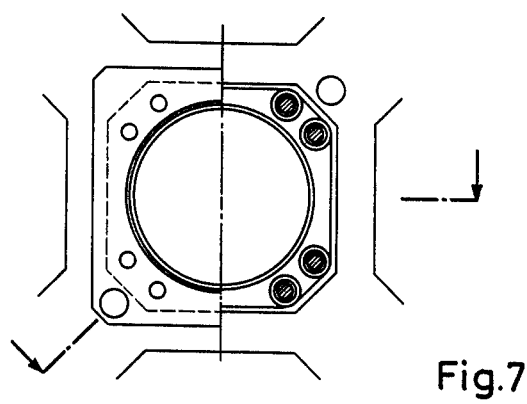
Fig.7

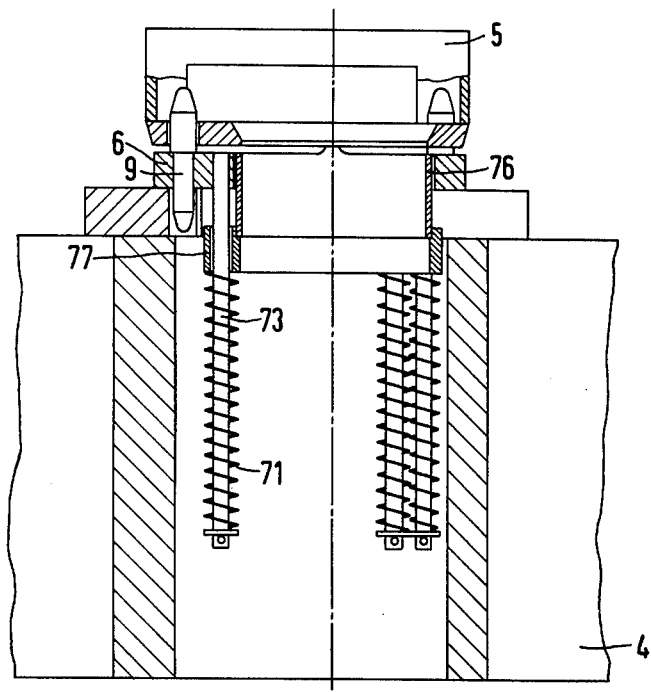
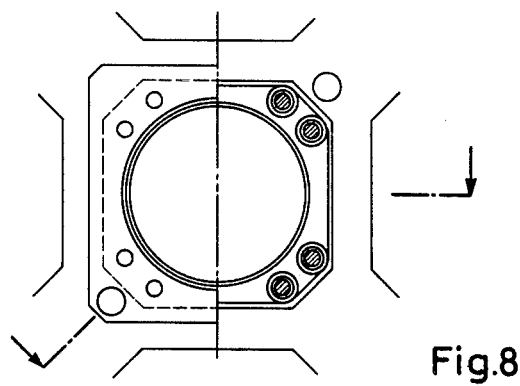
Fig.8

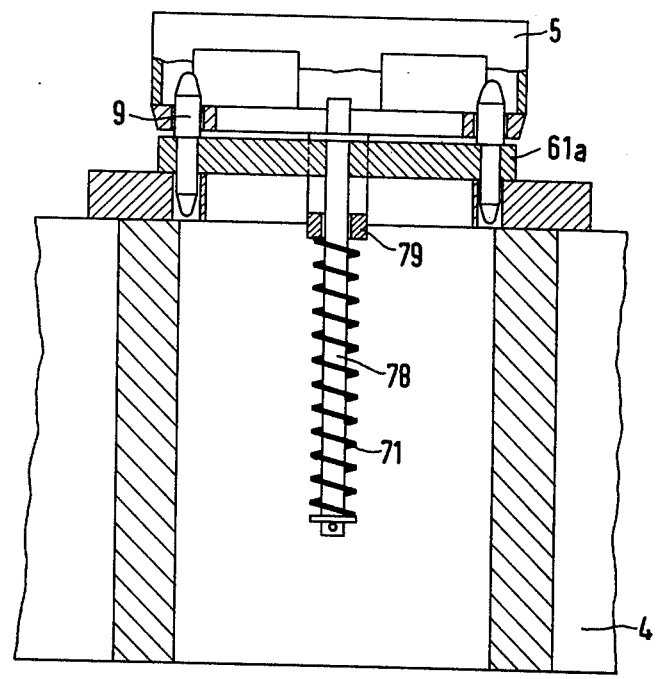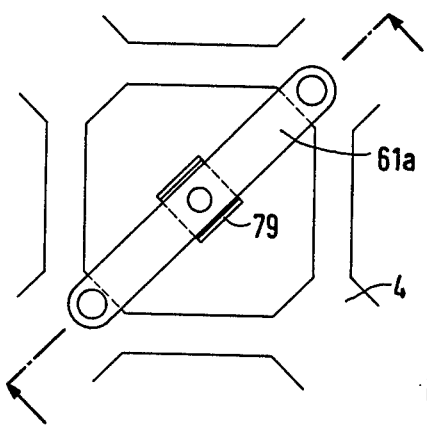
Fig.9

RESILIENT TENSION DEVICE IN NUCLEAR REACTORS

BACKGROUND OF THE INVENTION

The present invention relates to a nuclear power reactor having an active zone containing a plurality of fuel elements containing a large number of rod-shaped fuel rods. The fuel elements are mounted between a lower and an upper grid plate. More particularly, the invention relates to a resilient tension device which is provided for each fuel element to tension hold the same between the grid plates.

The fuel elements are normally tightly packed and are subjected to a longitudinal flow of a fluid coolant which may be liquid or gaseous. Because of this flow, the fuel elements and the fuel rods contained therein can now be mechanically stressed in such a manner that vibrations can develop. Upon first impression, it would seem that this could be prevented by firmly clamping the fuel elements between the upper and lower grid plates which constitute part of the core frame. This, however, is not possible because of the different thermal expansion coefficients of the different materials used in the construction of the core. For this reason, the attempt has already been made to hold the fuel elements down against the flow pressure of the coolant by springs in the head portion and to thereby compensate for the differences in thermal expansion. However, this results in relatively complicated configurations because the vibrations of the fuel elements must be reliably avoided.

SUMMARY OF THE INVENTION

It is an object of the invention to provide support for the fuel elements of a nuclear reactor. It is another object to provide a device which will afford a vibration-free support of the fuel elements within the flow of coolant and take up as little space as possible.

According to the invention, the fuel elements are held between the two grid plates by placing a tension device between each fuel element and one of the grid plates. The tension device engages the end portion of the fuel element on the one hand, and one of the grid plates on the other hand.

According to a feature of the invention, resilient-pressure means are disposed between one of the grid plates and the end portion of the fuel element facing the one grid plate for tension holding the fuel element against the other one of the grid plates. Also provided are engaging means for engaging and positioning the resilient-pressure means and the fuel element with respect to the one plate.

Preferably, the fuel element is cooled with a coolant flowing in a direction from the one grid plate to the other grid plate. The resilient-pressure means can then include a frame structure having a through opening for passing the coolant to the fuel element as well as a spring tension means mounted in the frame structure so as to be in contact with the end portion of the fuel element for imparting a force thereto in the direction of the coolant flow whereby the fuel element is tension held against the other one of the grid plates. The engaging means can include ancillary means forming part of the frame structure for engaging the one grid plate and the end portion of the fuel element.

With the above configuration, the tension device always pushes in the direction of the coolant flow, so that a rigid and vibration free seating exists between the other grid plate and the other end of the fuel element. A positive, locked mounting of the fuel elements at the grid plate via the tension device is effected by dowel pins and affords a torsion-proof mounting of the fuel elements, so that the occurrence of vibrations is thereby prevented to a great extent. The tension device can be configured in a manner to influence the entry of the coolant into the fuel element in a preferred manner. More specifically, the coolant is throttled and directed. The invention thus affords the advantage of rendering a special construction of the grid plate unnecessary; this would otherwise be very costly.

Although the invention is illustrated and described herein as a resilient tension device in nuclear reactors, it is nevertheless not intended to be limited to the details shown, since various modifications may be made therein within the scope and the range of the claims. The invention, however, together with additional objects and advantages will be best understood from the following description and in connection with the accompanying drawings.

BRIEF DESCRIPTION OF THE DRAWINGS

FIG. 2 is a vertical section showing a first embodiment of the invention and is taken on the line 2—2 in FIG. 2a;

FIG. 2a is partially a plan view and partially a cross section of FIG. 2;

FIG. 3 is a vertical section showing a second embodiment of the invention and is taken on the line 3—3 in FIG. 3a;

FIG. 3a is partially a plan view and partially a cross section of FIG. 3;

FIG. 4 is a variation of the embodiments of FIGS. 2 and 3 and is a vertical section taken on the line 4—4 in FIG. 4a;

FIG. 4a is partially a plan view and partially a cross section of FIG. 4;

FIG. 5 is a vertical section showing another embodiment of the invention and is taken on the line 5—5 in FIG. 5a;

FIG. 5a is partially a plan view and partially a cross section of FIG. 5;

FIG. 5b is a vertical section showing another embodiment and is taken on the line 5b—5b in FIG. 5c;

FIG. 5c is partially a plan view and partially a cross section of FIG. 5b;

FIG. 6 shows a further embodiment in vertical section and is taken on the line 6—6 in FIG. 6a;

FIG. 6a is partially a plan view and partially a cross section of FIG. 6;

FIG. 7 is a vertical section showing still another embodiment and is taken on the line 7—7 in FIG. 7a;

FIG. 7a is partially a plan view and partially a cross section of FIG. 7;

FIG. 8 is a vertical section of a further embodiment in cross section taken on the line 8—8 in FIG. 8a;

FIG. 8a is partially a plan view and partially a cross section of FIG. 8;

FIG. 9 is a vertical section of a final embodiment of the invention and is taken on the line 9—9 in FIG. 9a; and FIG. 9a is partially a plan view and partially a cross section of FIG. 9.

DESCRIPTION OF THE PREFERRED EMBODIMENTS

Figure 1:
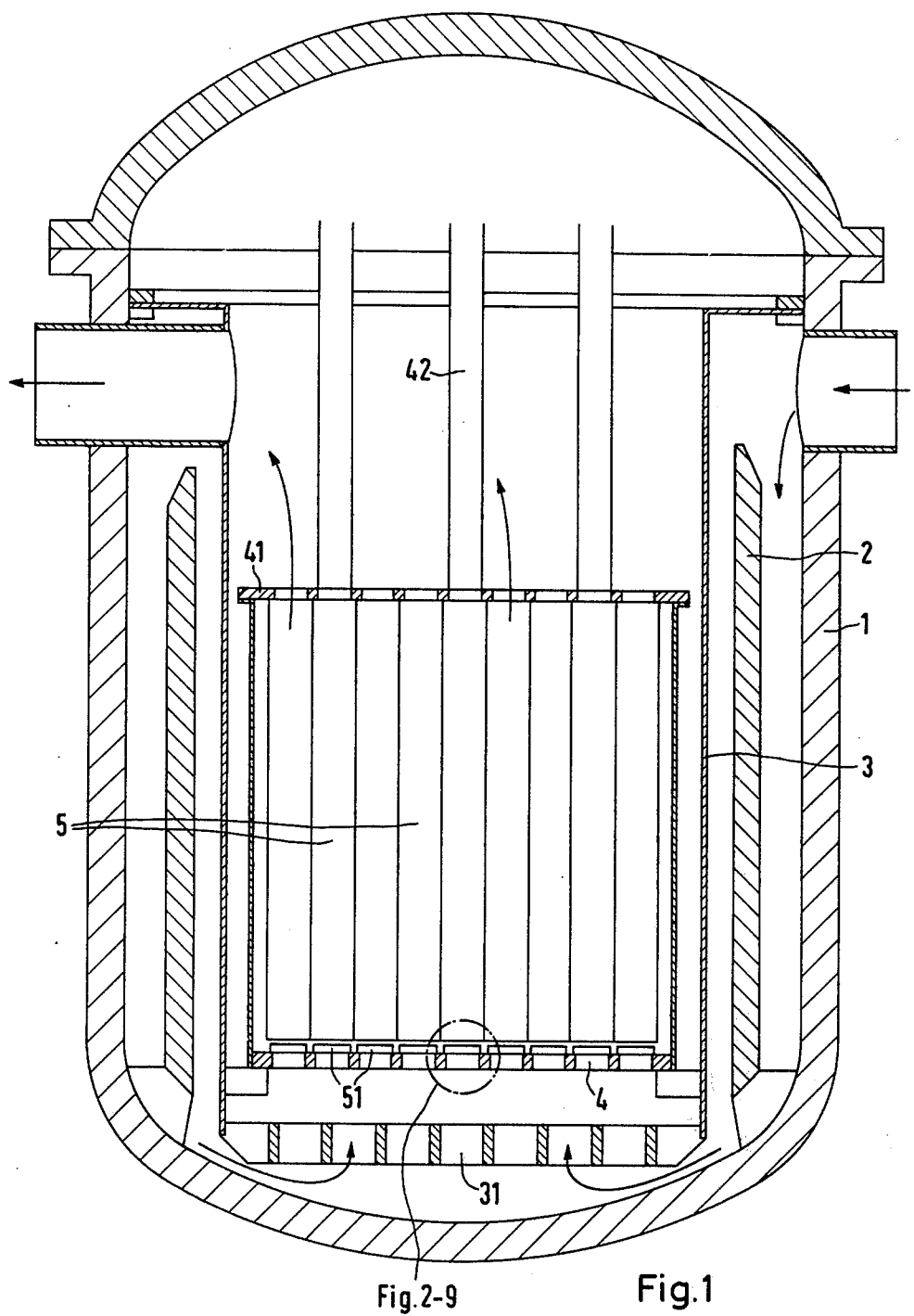
FIG. 1 is an elevation view, partially in section, of the pressure vessel of a nuclear reactor which indicates by means of a circle the preferred location of the resilient tension device according to the invention.

FIG. 1 shows a reactor pressure vessel 1 within which a thermal shield 2 is arranged in surrounding relation to the core tank 3. The core tank 3 is closed off at its lower portion with a core plate 31 having appropriate cutouts for the coolant. The flow of the coolant is indicated by arrows. The active part of the nuclear reactor is located within the core tank 3 and is composed of fuel elements 5. The fuel elements 5 are held in place here by the lower grid plate 4 and the upper grid plate 41. Several control rod guides 42 are shown schematically above the upper grid plate 41.

Between the individual fuel elements 5 and the lower grid plate 4, there are arranged resilient tension members which, on the one hand, adjust the fuel elements 5 in the horizontal direction with respect to the lower grid plate 4 and, on the other hand, ensure that the elements 5 firmly contact the upper grid plate 41 by means of spring pressure. This spring pressure is further augmented by the coolant flow, so that vertical vibrations of the fuel elements are reliably prevented. Vibrations and the abrasion at the contact points accompanying such vibration is therefore prevented. The broken-line circle in FIG. 1 indicates the location in the reactor pressure vessel of the resilient tension device of the invention. FIGS. 2 to 9 illustrate embodiments of the resilient tension device of the invention and are discussed in detail below.

FIG. 2 shows the lower grid plate designated by 4 and the end portion of the fuel element by 5. The tension device includes a resilient-pressure means disposed between the end portion 5 and the grid plate 4. The resilient-pressure means includes a frame structure assembled of the plates 6 and 61 as well as angle pieces 62. The plates 6 and 61 each have a through opening in the center for passing coolant. Engaging means for engaging and positioning the resilient-pressure means includes ancillary means on the frame structure in the form of dowel pins 9 for engaging the fuel element base 5 as well as dowel pins 8 for engaging the lower grid plate 4. The resilient-pressure means can further include spring tension means mounted in the frame structure so as to be in contact with the end portion 5 for imparting a force thereto. The spring tension means can include rods 7 which are guided in the plates 6 and 61 and are pushed upwardly by springs 71 coacting with collars 72 on the pins. The pins pushed upwardly in this manner are in contact with the end portion 5 of the fuel element. The tensioning force is thus supplied here by the springs 71 and acts in the direction of the coolant flow, that is, from the bottom to the top in FIG. 2. The springs must have a strength sufficient to enable them to support the weight of the fuel element as well as press the same against the upper grid plate 41. The applying force is maintained under operating conditions with the flow pressure of the coolant having a supporting effect.

FIG. 3 shows another embodiment which has considerably lower structural height because the height of the grid plate 4 is utilized. In this embodiment, the engaging means includes centering pins 43 arranged on the lower grid plate 4 and serve to adjust the tensioning device and the fuel element base 5. During the assembly of the reactor core, the tension device is pushed onto pins 43 first followed by the fuel element. The tension device functions in a way similar to the device of FIG. 2. The lower plate 61 is substantially smaller and is located within the bore of the grid plate 4. The plate 61 is rigidly connected with the upper plate 6 by lateral struts 62. Here also, rods 7 are guided in this frame and hold the fuel element 5 by means of springs 71.

Another embodiment is shown in FIG. 4. In this embodiment the lower plate 63 of the frame is braced against support means of the frame structure in the form of projections 44 on the lower grid plate 4. Rods 73 are movably supported in plate 63 and are rigidly connected with the upper plate 6. The plate 6 is in turn slideably supported on dowel pins 43 of the lower grid plate 4 and is in direct contact with the base of the fuel element. In this manner, the fuel element is again pressed by means of the springs 71 upward against the upper grid plate 41.

Still another embodiment of the invention is shown in FIG. 5. Here the plate 6 is provided with rods 73 arranged in pairs on which contact surface means in the form of a connecting plate 74 is urged upwardly by the springs 71. Rod-like projections 52 of the fuel element base 5 extend through bores in the plate 6 and rest on the connecting plates 74. Because the connecting plates 74 are spring-loaded, the fuel element is pressed in this manner against the upper grid plate 41.

The embodiment of FIG. 5a is a construction similar to that of FIG. 5. Instead of the rod-like projections 52, which are rigidly connected with the base of fuel element 5, a plate 63 is provided here which is separate from the fuel element and which is supported by the plates 74 via inserted rod-like projections 75.

An embodiment very similar to that of FIG. 5a is shown in FIG. 6. The force in FIG. 6 is transmitted by supporting rod-like projections in the form of pins 81 which are attached to the connecting plates 74 corresponding to respective pairs of parallel rods 73. The pins 81 can slide in corresponding bores of the plate 6.

Another embodiment is shown in FIG. 7 and has a central tube 76 which pushes with its upper edge against the base of fuel element 5. The force is introduced via a flange 75 on tube 76 by the springs 71 which are guided on rods 73. The plate 6 is provided with ancillary means in the form of centering pins 9 which extend through and establish the connection to the grid plate 4 and the end portion 5 of fuel element. The tube 76 slides in the central bore of the plate 6 and is additionally guided by the lower flange 77 which is provided with bores for the rods 73.

FIG. 8 illustrates an embodiment which likewise includes a tube 76 that functions as the force-transmitting member with respect to the end portion 5 of the fuel element. However, there the length of tube 76 is considerably shorter and therefore requires only a single, lower flange 77 for guidance on the spring rods 73. The springs 71 engage here underneath this flange 77.

FIG. 9 illustrates an embodiment that is simplified considerably compared to those embodiments discussed above. Here, the frame structure of the tension device includes a cross member in the form of a strut 61a mounted with dowel pins 9 so as to be diagonal with respect to the grid structure of the grid plate 4. The dowel pins also center the end portion 5 of the fuel element. In contrast to the foregoing embodiments, spring tension means in the embodiment of FIG. 9 has only a single, central tensioning mechanism. This mechanism consists of a rod 78 fastened at the strut 61a and a forked shoe 79 movable thereon. The forked shoe 79 transmits the tensioning force to the fuel element 5 via the spring 71 which also constitutes part of the spring tension means. Because only one spring is provided in this embodiment, this spring must have a considerably greater spring force than the springs in the other embodiments wherein several springs supply the tensioning force.

The several embodiments of the invention demonstrate that the tension device of the invention is readily adaptable to the remaining portion of the reactor core and that of the fuel elements as well as that of the support structure. Through the introduction of a central tube as the force-transmitting member, an alignment of the coolant flow prior to its entrance into the region of the fuel elements can also be achieved. It is also possible to influence the quantity of coolant passing through by appropriate selection of the cross-section of such a tube. This is aside from the fact that throttling devices which are known per se can in addition also be installed therein. It will further be seen that this configuration can be made with a great saving of space and therefore necessitates practically no height increase of the reactor core. With the greatest possible structural simplicity, and therefore also with interchangeability of parts, a reliable fixation of the corresponding ends of the fuel elements relative to the grid plate is provided, so that with practically unimpeded thermal expansion of the fuel elements in the axial direction, a mounting of the fuel elements of such stability in the horizontal direction is nevertheless provided so that the initiation of vibrations is minimal.

As already mentioned, the embodiments of the tension devices according to the invention described herein are positioned on the lower grid plate as the preferred point of attachment. However, they can also be arranged at the upper end of the fuel element, more specifically, under the upper grid plate. The choice of the location of installation will here depend on the selected reactor construction as well as on the technique for exchanging the fuel elements.

What is claimed is:

1. A nuclear reactor fuel element assembly including vertically interspaced upper and lower grid plates, at least one fuel element vertically positioned between said grid plates, and a system for guiding a coolant flow upwardly through said grid plates and said element, said grid plates forming grid openings and said element having upper and lower ends registered with said openings; wherein the improvement comprises said element's upper end abutting said upper grid plate and said element's lower end being spaced above said lower grid plate to define a space between said element's lower end and said lower grid plate, a frame structure having an upper level and disposed in said space and upwardly supported by said lower grid plate and having an open construction to permit said coolant to flow upwardly through said element's lower end, at least one upwardly acting spring positioned below the upper level of said frame structure and connected with the frame structure, means extending vertically slidably through said frame structure for transmitting the force of said spring upwardly to said fuel element's lower end; and means for pinning said element's lower end and said frame structure and said lower grid plate together, the second-named means holding said element's lower end and said frame in registration with said lower grid's opening and against relative rotative twisting and with said element's lower end free for vertical movement, said frame structure comprising upper and lower frame plates having central through openings for passing said coolant flow upwardly therethrough, and said spring being positioned between said frame plates, said lower frame plate being positioned in said lower grid plate's opening below the latter's upper level.

2. A nuclear reactor fuel element assembly including vertically interspaced upper and lower grid plates, at least one fuel element vertically positioned between said grid plates, and a system for guiding a coolant flow upwardly through said grid plates and said element, said grid plates forming grid openings and said element having upper and lower ends registered with said openings; wherein the improvement comprises said element's upper end abutting said upper grid plate and said element's lower end being spaced above said lower grid plate to define a space between said element's lower end and said lower grid plate, a frame structure having an upper level and disposed in said space and upwardly supported by said lower grid plate and having an open construction to permit said coolant to flow upwardly through said element's lower end, at least one upwardly acting spring positioned below the upper level of said frame structure and connected with the frame structure, means extending vertically slidably through said frame structure for transmitting the force of said spring upwardly to said fuel element's lower end; and means for pinning said element's lower end and said frame structure and said lower grid plate together, the second-named means holding said element's lower end and said frame in registration with said lower grid's opening and against relative rotative twisting and with said element's lower end free for vertical movement, said frame structure comprising a frame plate having a central through opening for passing said coolant flow upwardly therethrough, said frame plate being positioned above the upper surface of said lower grid plate and said spring being positioned below said surface in said lower grid plate's opening.

3. The assembly of claim 2 in which said spring force transmitting means comprises a coolant flow tube slidably extending vertically through said frame plate's central opening.

* * * * *